(12) United States Patent
Higano et al.

(10) Patent No.: US 9,605,159 B2
(45) Date of Patent: Mar. 28, 2017

(54) LOW REFRACTIVE INDEX FILM-FORMING COMPOSITION AND METHOD OF FORMING LOW REFRACTIVE INDEX FILM USING THE SAME

(71) Applicant: MITSUBISHI MATERIALS CORPORATION, Tokyo (JP)

(72) Inventors: Satoko Higano, Naka (JP); Kazuhiko Yamasaki, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 479 days.

(21) Appl. No.: 13/909,498

(22) Filed: Jun. 4, 2013

(65) Prior Publication Data

US 2013/0327252 A1     Dec. 12, 2013

(30) Foreign Application Priority Data

Jun. 6, 2012 (JP) ................. 2012-128553

(51) Int. Cl.
| | | |
|---|---|---|
| C04B 41/49 | (2006.01) | |
| C09D 5/00 | (2006.01) | |
| C09D 1/00 | (2006.01) | |
| C09D 7/12 | (2006.01) | |
| C08K 3/36 | (2006.01) | |

(52) U.S. Cl.
CPC ............ *C09D 5/006* (2013.01); *C09D 1/00* (2013.01); *C09D 7/1216* (2013.01); *C08K 3/36* (2013.01)

(58) Field of Classification Search
CPC ........ C09D 5/006; C09D 1/00; C09D 7/1216; C08K 3/36
See application file for complete search history.

(56) References Cited

U.S. PATENT DOCUMENTS 4,687,707 A     8/1987   Matsuo et al.

FOREIGN PATENT DOCUMENTS

| CN | 102186668 A | 9/2011 |
| JP | 09-208898 A | 8/1997 |
| JP | 2005-199707 A | 7/2005 |
| JP | 2007-008088 A | 1/2007 |
| JP | 2007-182511 A | 7/2007 |
| JP | 4328935 B2 | 9/2009 |
| TW | 200838952 A | 10/2008 |
| WO | WO-00/15552 A1 | 3/2000 |

OTHER PUBLICATIONS

Notice of Reasons for Rejection mailed Feb. 9, 2016, issued for the Japanese patent application No. 2012-128553 and English translation thereof.
Office Action mailed Mar. 31, 2016, issued for the Chinese patent application No. 201310221351.0 and English translation thereof.
Office Action mailed Jun. 21, 2016, issued for the Taiwanese patent application No. 102119872 and English translation thereof.

*Primary Examiner* — Kaj K Olsen
*Assistant Examiner* — Alexander Polyansky
(74) *Attorney, Agent, or Firm* — Locke Lord LLP

(57) ABSTRACT

A low refractive index film-forming composition and a low refractive index film are prepared with a method in which fluoroalkyl group-containing silicon alkoxide (B) is mixed with silicon alkoxide (A) to obtain a mixture; water (C), formic acid (D), and an organic solvent (E) are mixed with the mixture to produce a hydrolysate of the mixture; and silica sol (F) obtained by dispersing beaded colloidal silica particles in a liquid medium is mixed with the hydrolysate.

3 Claims, No Drawings

LOW REFRACTIVE INDEX FILM-FORMING COMPOSITION AND METHOD OF FORMING LOW REFRACTIVE INDEX FILM USING THE SAME

BACKGROUND OF THE INVENTION

Field of the Invention

The present invention relates to a low refractive index film-forming composition for forming a low refractive index film which is used for a display panel, a solar cell, an optical lens, a camera module, a sensor module, or the like; and a method of forming a low refractive index film. More specifically, the invention relates to a low refractive index film-forming composition for forming an antireflection film which prevents the reflection of incident light in the solar cell and the like or for forming an interlayer film which is used for a sensor, a camera module, or the like and uses a refractive index difference; and a method of forming a low refractive index film using the same.

Priority is claimed on Japanese Patent Application No. 2012-128553, filed on Jun. 6, 2012, the content of which is incorporated herein by reference.

Description of Related Art

A film having a low refractive index which is formed on a surface of a transparent substrate such as glass or plastic is used as an antireflection film for preventing the reflection of incident light on a display panel such as a cathode-ray tube display, a liquid crystal display, or an organic EL display, solar cells, an optical lens, or a showcase glass. For example, an antireflection film for improving visibility is provided on a display surface side of a display panel. In addition, in the field of a solar cell, in order to prevent the reflection of incident sunlight and to improve the absorptance of light, a countermeasure is provided, for example, a film having a low refractive index is formed on a surface or the like of a glass substrate as an antireflection film.

As such a film for preventing the reflection, in the related art, a single-layer film which is formed using a gas phase method such as a vacuum deposition method, a sputtering method, or the like and is formed of $MgF_2$, cryolite, or the like, has been put into practice. In addition, a multi-layer film or the like, which is formed by alternately laminating a low refractive index film formed of $SiO_2$ or the like and a high refractive index film formed of $TiO_2$, $ZrO_2$, or the like on a substrate, is also known to be able to obtain a high antireflection effect. However, in the gas phase method such as a vacuum deposition method, a sputtering method, or the like, there is a problem in terms of manufacturing cost because a manufacturing apparatus and the like are expensive. In addition, in the method of forming a multi-layer film by alternately laminating a low refractive index film and a high refractive index film, the manufacturing process is complicated and much time and effort are required, which is not practical.

Therefore, from the viewpoint of manufacturing cost or the like, recently, a coating method such as a sol-gel method has attracted much attention. In the sol-gel method, generally, a sol-gel solution is prepared and a transparent substrate such as glass is coated with this solution, followed by drying, firing, and the like to form a film. However, the film formed using the sol-gel method has various problems in that a desired low refractive index is not obtained; and that defects of adhesion with the substrate and cracks are generated, as compared to the film formed using the gas phase method such as a vacuum deposition method.

As such a film forming method using the sol-gel method, a method of forming a coating film is disclosed in which a silicon compound (A) which is tetraalkoxysilane, a silicon compound (B) which is fluorine-containing trialkoxysilane, alcohol (C), and oxalic acid (D) are mixed with each other at a predetermined ratio to obtain a reaction mixture; the reaction mixture is heated at a predetermined temperature while maintaining the absence of water to prepare a polysiloxane solution; and a surface of a substrate is coated with this polysiloxane solution, followed by thermal curing (for example, refer to Japanese Unexamined Patent Application First Publication No. H9-208898 (claim 1 and paragraph [0009] to paragraph [0010])).

In this method, the polysiloxane solution is prepared not by condensation using hydrolysis of the silicon compound (A) and the silicon compound (B) but by heating in the reaction mixture in the absence of water. As a result, during the reaction, the polysiloxane solution does not become cloudy and the inhomogeneous production of polysiloxane can be suppressed. In addition, even when a ratio of the silicon compound (B) is reduced compared to the related art, a film having a low reflective index can be obtained.

SUMMARY OF THE INVENTION

Problems to be Solved the Invention

On the other hand, in the above-described forming method disclosed in Japanese Unexamined Patent Application First Publication No. H9-208898 of the related art, although there are advantageous effects in that the polysiloxane solution does not become cloudy and the inhomogeneous production of polysiloxane can be suppressed during the preparation of the polysiloxane solution, there are problems in that the advance rate of the hydrolysis reaction is slow, much time is required for the preparation of the sol-gel solution, and a sufficient reduction in refractive index is difficult. Therefore, there is room for further improvement in the formation of a low refractive index film using the sol-gel method.

An object of the invention is to provide a low refractive index film-forming composition for forming a low refractive index film which has a low refractive index, a high antireflection effect, and superior wettability of a film surface; and a low refractive index film.

Means for Solving the Problem

According to a first aspect of the invention, a low refractive index film-forming composition is provided which is prepared with a method in which fluoroalkyl group-containing silicon alkoxide (B) represented by the following formula (2) is mixed with silicon alkoxide (A) represented by the following formula (1) at a mass ratio of 1:0.6 to 1:1.6 (A:B) to obtain a mixture; 0.5 parts by mass to 5.0 parts by mass of water (C), 0.005 parts by mass to 0.5 parts by mass of formic acid (D), and 1.0 part by mass to 5.0 parts by mass of organic solvent (E) of alcohol, glycol ether, or glycol ether acetate are mixed with 1 part by mass of the mixture to produce a hydrolysate of the mixture; and silica sol (F) obtained by dispersing beaded colloidal silica particles in a liquid medium is mixed with the hydrolysate such that a content of $SiO_2$ in the silica sol (F) is 50 parts by mass to 500 parts by mass with respect to 100 parts by mass of content of $SiO_2$ in the hydrolysate, in which the beaded colloidal silica particles are formed of a plurality of spherical colloidal silica particles having an average particle size of 5 nm to 50 nm and metal oxide-containing silica through which the plurality of spherical colloidal silica particles are linked to each other, a ratio $D_1/D_2$ of an average particle size ($D_1$ nm) of the spherical colloidal silica particles, which is measured with a dynamic light scattering method, to an average particle size ($D_2$ nm) of the spherical colloidal silica particles, which is obtained according to an expression of $D_2=2720/S$ in which a specific surface area S m$^2$/g is measured with a nitrogen adsorption method, is higher than or equal to 3, the average particle size $D_1$ is 30 nm to 300 nm, and the spherical colloidal silica particles are linked to one plane.

$$Si(OR)_4 \qquad (1)$$

(wherein R represents an alkyl group having 1 to 5 carbon atoms)

$$CF_3(CF_2)nCH_2CH_2Si(OR^1)_3 \qquad (2)$$

(wherein $R_1$ represents an alkyl group having 1 to 5 carbon atoms and n represents an integer of 0 to 8)

According to a second aspect of the invention, a method of forming a low refractive index film is provided using the above-described low refractive index film-forming composition.

Effect of the Invention

The low refractive index film-forming composition according to the first aspect is prepared with a method in which fluoroalkyl group-containing silicon alkoxide (B) is mixed with silicon alkoxide (A) at the specific ratio to obtain a mixture; water (C), formic acid (D), and an organic solvent (E) are mixed with the mixture at the specific ratio to produce a hydrolysate of the mixture; and silica sol (F) obtained by dispersing beaded colloidal silica particles in a liquid medium is mixed with the hydrolysate at the specific ratio. As a result, with the low refractive index film-forming composition according to the first aspect, a film having a significantly low refractive index of about 1.2 to 1.38 can be formed. In addition, when the low refractive index film-forming composition according to the first aspect is used, a low refractive index film having a significantly superior wettability of a film surface can be formed. Therefore, for example, even when a film having a high refractive index is laminated on this low refractive index film to form a film having a lower refractive index, satisfactory coating properties can be obtained and a film having a uniform thickness can be obtained.

In the method of forming a low refractive index film according to the second aspect, a low refractive index film is formed using the low refractive index film-forming composition according to the first aspect. Therefore, a low refractive index film having a significantly low refractive index of about 1.2 to 1.38 can be formed. In addition, in the method of forming a low refractive index film according to the second aspect, a low refractive index film having a significantly superior wettability of a film surface can be formed.

DETAILED DESCRIPTION OF THE INVENTION

Next, embodiments of the present invention will be described.

A low refractive index film-forming composition according to an embodiment of the invention is prepared by mixing a hydrolysate of specific silicon compounds with silica sol (F), obtained by dispersing beaded colloidal silica particles in a liquid medium, at a specific ratio. The hydrolysate is produced by condensation using hydrolysis of silicon alkoxide (A) represented by the following formula (1) and fluoroalkyl group-containing silicon alkoxide (B) represented by the following formula (2).

$$Si(OR)_4 \qquad (1)$$

(wherein R represents an alkyl group having 1 to 5 carbon atoms)

$$CF_3(CF_2)nCH_2CH_2Si(OR^1)_3 \qquad (2)$$

(wherein $R_1$ represents an alkyl group having 1 to 5 carbon atoms and n represents an integer of 0 to 8)

The reason why the hydrolysate of silicon alkoxide (A) and fluoroalkyl group-containing silicon alkoxide (B) is used is to improve the wettability of a film surface. For example, when a hydrolysate of only silicon alkoxide (A) is used, the wettability of a film surface deteriorates, coating properties cannot be sufficiently obtained during the film formation by lamination, and a film having a uniform film thickness cannot be obtained.

Specific examples of silicon alkoxide (A) represented by the formula (1) include at least any one selected from the group consisting of tetramethoxysilane, tetraethoxysilane, methyltrimethoxysilane, ethyltrimethoxysilane, methyltriethoxysilane, ethyltriethoxysilane, vinyltrimethoxysilane, vinyltriethoxysilane, phenyltrimethoxysilane, and phenyltriethoxysilane. Among these, tetramethoxysilane is preferable from the viewpoint of obtaining a film having high hardness. In addition, specific examples of fluoroalkyl group-containing silicon alkoxide (B) represented by the formula (2) include at least any one selected from the group consisting of trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. Among these, trifluoropropyltrimethoxysilane is preferable from the viewpoints of high hydrolysis reactivity and easy reaction control.

A hydrolysate of silicon alkoxide (A) represented by the formula (1) and fluoroalkyl group-containing silicon alkoxide (B) represented by the formula (2) is produced by hydrolysis (condensation) thereof in an organic solvent. Specifically, first, the silicon alkoxide (A) and the silicon alkoxide (B) are mixed at a ratio of 1:0.6 to 1:1.6 (A:B) to obtain a mixture. In this case, the reason why the ratio of fluoroalkyl group-containing silicon alkoxide (B) to silicon alkoxide (A) is limited to the above-described range is as follows. When the mass ratio of silicon alkoxide (B) to silicon alkoxide (A) is too low, the refractive index of a formed film is not sufficiently reduced. In addition, when the mass ratio of silicon alkoxide (B) to silicon alkoxide (A) is too high, the wettability of a film surface deteriorates. In the above-described range, it is preferable that the mass ratio of silicon alkoxide (A) to silicon alkoxide (B) be 1:0.65 to 1:1.3 (A:B).

In addition, 0.5 parts by mass to 5.0 parts by mass of water (C), 0.005 parts by mass to 0.5 parts by mass of formic acid (D), and 1.0 part by mass to 5.0 parts by mass of organic solvent (E) of one or more selected from the group consisting of alcohol, glycol ether, and glycol ether acetate are mixed with 1 part by mass of the mixture to advance the hydrolysis reaction of silicon alkoxide (A) and silicon alkoxide (B), thereby obtaining the hydrolysate. In this case, the reason why the ratio of water (C) is limited to the above-described range is as follows. When the ratio of water (C) is less than the lower limit, the refractive index is not sufficiently reduced. On the other hand, when the ratio is higher than the upper limit, the haze of a film increases. In the above-described range, it is preferable that the ratio of water (C) be 0.8 parts by mass to 3.0 parts by mass. As water (C), ion exchange water, pure water, or the like is preferably used in order to prevent the infiltration of impurities.

Formic acid (D) functions as an acid catalyst for promoting the hydrolysis reaction. The reason why the catalyst is limited to formic acid (D) is that a film having a low refractive index and a small amount of haze is easily formed by using formic acid (D). Examples of the catalyst for promoting the hydrolysis reaction include basic catalysts such as ammonia; inorganic acids such as nitric acid and hydrochloric acid; and organic acids other than formic acid such as oxalic acid and acetic acid. However, for example, when nitric acid is used as the catalyst, inhomogeneous gelation is easily promoted in a formed film. Therefore, the haze of the film tends to increase and the above-described effects obtained in the case of using formic acid (D) are difficult to obtain. In addition, the reason why the ratio of formic acid (D) is limited to the above-described range is as follows. When the ratio of formic acid (D) is lower than the lower limit, the reactivity is low and thus a film is not formed. On the other hand, when the ratio of formic acid (D) is higher than the upper limit, the haze of a film increases. In the above-described range, it is preferable that the ratio of formic acid (D) be 0.008 parts by mass to 0.2 parts by mass.

Examples of alcohol used as the organic solvent (E) include at least any one selected from the group consisting of methanol, ethanol, propanol, and isopropyl alcohol (IPA). In addition, examples of glycol ether include at least any one selected from the group consisting of ethylene glycol monomethyl ether, diethylene glycol monomethyl ether, propylene glycol monomethyl ether, dipropylene glycol monomethyl ether, ethylene glycol monoethyl ether, diethylene glycol monoethyl ether, propylene glycol monoethyl ether, and dipropylene glycol monoethyl ether. In addition, examples of glycol ether acetate include at least any one selected from the group consisting of ethylene glycol monomethyl ether acetate, diethylene glycol monomethyl ether acetate, propylene glycol monomethyl ether acetate, dipropylene glycol monomethyl ether acetate, ethylene glycol monoethyl ether acetate, diethylene glycol monoethyl ether acetate, propylene glycol monoethyl ether acetate, and dipropylene glycol monoethyl ether acetate. The reason why the organic solvent (E) is limited to alcohol, glycol ether, or glycol ether acetate is that these solvents are easily mixed with silicon alkoxide (A) and fluoroalkyl group-containing silicon alkoxide (B). Among these, ethanol, IPA, ethylene glycol monomethyl ether, and ethylene glycol monomethyl ether acetate are preferable from the viewpoints that the control of the hydrolysis reaction is easy and that superior coating properties can be obtained during film formation. The reason why the ratio of the organic solvent (E) is limited to the above-described range is as follows. When the ratio of the organic solvent (E) is lower than the lower limit, haze is increased by a non-uniformly film thickness during film formation. On the other hand, when the ratio of the organic solvent (E) is higher than the upper limit, the haze of a coating film is increased by precipitates produced in the solution. In the above-described range, it is preferable that the ratio of the organic solvent (E) be 1.5 parts by mass to 3.5 parts by mass.

Silica sol (F) contained in the low refractive index film-forming composition according to the embodiment is sol obtained by dispersing beaded colloidal silica particles in a liquid medium. Generally, as silica particles contained in silica sol, spherical, acicular, or plate particles are also widely known in addition to beaded particles. However, in this embodiment, silica sol (F) obtained by dispersing beaded colloidal silica particles in a liquid medium is used. The reason why the silica sol (F) is limited to one obtained by dispersing beaded colloidal silica particles in a liquid crystal medium is as follows. In the presence of beaded colloidal silica particles, pores are easily generated in a formed film and thus a film having a significantly low refractive index can be formed. In addition, since the size of the particles is small, the haze of a film can be reduced.

The beaded colloidal silica particles are obtained by linking plural spherical colloidal silica particles having an average particle size of 5 nm to 50 nm to each other through metal oxide-containing silica. In this case, the reason why the average particle size of the plural spherical colloidal silica particles contained in the beaded colloidal silica particles is limited to the above-described range is as follows. When the average particle size is less than the lower limit, the refractive index of a formed film is not sufficiently reduced. On the other hand, when the average particle size is greater than the upper limit, the haze of a film is increased by convex and concave portions of a film surface. In the above-described range, it is preferable that the average particle size of the plural spherical colloidal silica particles contained in the beaded colloidal silica particles be 5 nm to 30 nm. It should be noted that the average particle size of the spherical colloidal silica particles is obtained using a BET method.

In addition, regarding the beaded colloidal silica particles, a ratio $D_1/D_2$ of an average particle size ($D_1$ nm) of the spherical colloidal silica particles, which is measured with a dynamic light scattering method, to an average particle size ($D_2$ nm) of the spherical colloidal silica particles, which is obtained according to an expression of $D_2=2720/S$ in which a specific surface area S $m^2/g$ is measured with a nitrogen adsorption method, is higher than or equal to 3; the average particle size $D_1$ is 30 nm to 300 nm; and the spherical colloidal silica particles are linked to one plane. The reason why the ratio $D_1/D_2$ is limited to being higher than or equal to 3 is that the haze of a formed film increases when the ratio is less than 3. In the above-described range, it is preferable that the ratio $D_1/D_2$ be 3 to 20. In addition, the reason why the average particle size $D_1$ is limited to the above-described range is as follows. When the average particle size $D_1$ is less than the lower limit, particles aggregate and precipitates are easily formed. On the other hand, when the average particle size $D_1$ is greater than the upper limit, the haze of a formed film increases. In the above-described range, it is preferable that the average particle size $D_1$ be 35 nm to 150 nm. In addition, examples of the metal oxide-containing silica through which the spherical colloidal silica particles are linked to each other include amorphous silica or amorphous alumina. In addition, examples of the liquid medium in which the beaded colloidal silica particles are dispersed include at least any one selected from the group consisting of methanol, ethanol, IPA, ethylene glycol, propylene glycol monomethyl ether, and propylene glycol monomethyl ether acetate. It is preferable that a concentration of $SiO_2$ used in silica sol be 5% by mass to 40% by mass. When the concentration of $SiO_2$ in silica sol is too low, the refractive index of a formed film is not sufficiently reduced. On the other hand, when the concentration is too high, $SiO_2$ particles in silica sol easily aggregate and the solution may be unstable. As silica sol in which such beaded colloidal silica particles are dispersed, for example, silica sol disclosed in Japanese Patent No. 4328935 can be used.

The low refractive index film-forming composition according to the embodiment is prepared with method in which the silica sol (F) is mixed with the hydrolysate such that a content of $SiO_2$ in the silica sol (F) is 50 parts by mass to 500 parts by mass with respect to 100 parts by mass of content of $SiO_2$ in the hydrolysate. When the content of $SiO_2$ in the silica sol (F) is less than the lower limit, the refractive index of a formed film is not sufficiently reduced. On the other hand, when the content is greater than the upper limit, haze is increased by a non-uniformly film thickness. In the above-described range, it is preferable that the ratio of silica sol (F) be adjusted such that the content of $SiO_2$ in the silica sol (F) is 150 parts by mass to 350 parts by mass with respect to 100 parts by mass of content of $SiO_2$ in the hydrolysate.

In order to prepare the low refractive index film-forming composition according to the embodiment, first, the silicon alkoxide (A) and the fluoroalkyl group-containing silicon alkoxide (B) are weighed and prepared so as to obtain the predetermined ratio and mixed to obtain a mixture. Furthermore, an organic solvent is added to this mixture, followed by stirring, preferably, at a temperature of 30° C. to 40° C. for 5 minutes to 20 minutes. As a result, a first solution is prepared. Aside from this preparation, water (C) and formic acid (D) are mixed, followed by stirring, preferably, at a temperature of 30° C. to 40° C. for 5 minutes to 20 minutes. As a result, a second solution is prepared. In this case, since tetramethoxysilane or the like which is used as silicon alkoxide (A) is highly toxic, it is preferable that an oligomer obtained by polymerizing this monomer in advance 3 to 6 times be used. Next, the prepared first solution is held at a temperature of, preferably, 30° C. to 80° C. and the second solution is added to the first solution, followed by stirring for, preferably, 30 minutes to 180 minutes while maintaining the above temperature. As a result, a hydrolysate of the silicon alkoxide (A) and the fluoroalkyl group-containing silicon alkoxide (B) is produced. Silica sol in which the beaded colloidal silica particles are dispersed is mixed with the hydrolysate at the predetermined ratio. As a result, the low refractive index film-forming composition according to the embodiment is obtained.

Next, a method of forming a low refractive index film according to an embodiment of the invention will be described. The method of forming a low refractive index film according to the embodiment is the same as a method of the related art, except that the low refractive index film-forming composition according to the embodiment is used. First, a substrate such as glass or plastic is prepared and then is coated with the low refractive index film-forming composition according to the embodiment using, for example, a spin coating method, a die coating method, or a spray coating method. After coating, the substrate is dried, preferably, at a temperature 50° C. to 100° C. for 5 minutes to 60 minutes using a hot plate, an atmosphere firing furnace, or the like and is fired, preferably, at a temperature 100° C. to 300° C. for 5 minutes to 120 minutes using a hot plate, an atmosphere firing furnace, or the like to be cured, thereby obtaining a film. The film formed as above has a significantly low refractive index of about 1.15 to 1.4 because an appropriate amount of pores are generated inside the film. In addition, since the wettability of a film surface is superior and the water repellency is high, another film is easily formed on the surface of the formed film and thus the variability and the like are also superior. Therefore, the method of forming a low refractive index film according to the embodiment can be suitably used for forming an anti-reflection film which prevents the reflection of incident light on a display panel such as a cathode-ray tube display, a liquid crystal display, or an organic EL display, a solar cell, or a showcase glass; or for forming an interlayer film which is used for a sensor, a camera module, or the like and uses a refractive index difference.

EXAMPLES

Next, Examples and Comparative Examples of the invention will be described in detail.

Example 1-1

First, tetramethoxysilane (TMOS) was prepared as silicon alkoxide (A) and trifluoropropyltrimethoxysilane (TFPTMS) was prepared as fluoroalkyl group-containing silicon alkoxide (B). Silicon alkoxide (A) and fluoroalkyl group-containing silicon alkoxide (B) were weighed such that the ratio (mass ratio) of fluoroalkyl group-containing silicon alkoxide (B) was 0.6 with respect to the ratio of silicon alkoxide (A) of 1; and were put into a separable flask, followed by mixing. As a result, a mixture was obtained. 1.0 parts by mass of propylene glycol monomethyl ether acetate (PGMEA) as the organic solvent (E) was added to 1 part by mass of the mixture, followed by stirring at a temperature of 30° C. for 15 minutes. As a result, a first solution was obtained. As silicon alkoxide (A), an oligomer obtained by polymerizing a monomer in advance approximately 3 to 5 times was used.

In addition, aside from the preparation of the first solution, 1.0 part by mass of the mixture, 1.0 part by mass of ion exchange water (C), and 0.01 parts by mass of formic acid (D) were put into a beaker and were mixed, followed by stirring at a temperature of 30° C. for 15 minutes. As a result, a second solution was obtained. Next, the prepared first solution was held at a temperature of 55° C. in a water bath and the second solution was added to the first solution, followed by stirring for 60 minutes while maintaining the temperature. As a result, a hydrolysate of the silicon alkoxide (A) and the fluoroalkyl group-containing silicon alkoxide (B) was obtained.

Silica sol (F) in which beaded colloidal silica particles shown in Table 2 were dispersed was stirred and mixed with the obtained hydrolysate such that a content of $SiO_2$ in silica sol (F) was 200 parts by mass with respect to 100 parts by mass of content of $SiO_2$ in the hydrolysate. As a result, a composition was obtained.

Examples 1-2 and 1-3 and Comparative Examples 1-1 to 1-3

Compositions were prepared by the same method as that of Example 1-1, except that the ratio (mass ratio) of fluoroalkyl group-containing silicon alkoxide (B) with respect to the ratio of silicon alkoxide (A) of 1 or the kinds of silicon alkoxide (A) and fluoroalkyl group-containing silicon alkoxide (B) were changed as shown in the following Table 1 or 3; and the content of $SiO_2$ in silica sol (F) was changed as shown in Tables 2 and 4. In the tables, "TEOS" represents tetraethoxysilane and "TFPTES" represents trifluoropropyltriethoxysilane.

Examples 2-1 to 2-3 and Comparative Examples 2-1 to 2-3

Compositions were prepared by the same method as that of Example 1-1, except that the ratio of water (C) with respect to 1 part by mass of the mixture of silicon alkoxide (A) and fluoroalkyl group-containing silicon alkoxide (B) was changed as shown in the following Table 1 or 3; and the average particle size of the spherical colloidal silica particles contained in the beaded colloidal silica particles, $D_1/D_2$, and the content of $SiO_2$ in silica sol (F) were changed as shown in Tables 2 and 4.

Examples 3-1 to 3-3 and Comparative Examples 3-1 to 3-3

Compositions were prepared by the same method as that of Example 1-1, except that the ratio (mass ratio) of the acid with respect to 1 part by mass of the mixture of silicon alkoxide (A) and fluoroalkyl group-containing silicon alkoxide (B), or the kind of the acid was changed as shown in the following Table 1 or 3; and the average particle size of the spherical colloidal silica particles contained in the beaded colloidal silica particles, $D_1/D_2$, and $D_1$ were changed as shown in Tables 2 and 4.

Examples 4-1 to 4-3 and Comparative Examples 4-1 to 4-3

Compositions were prepared by the same method as that of Example 1-1, except that the ratio (mass ratio) of the organic solvent (E) with respect to 1 part by mass of the mixture of silicon alkoxide (A) and fluoroalkyl group-containing silicon alkoxide (B) or the kind of the organic solvent (E) was changed as shown in the following Table 1 or 3; and the average particle size of the spherical colloidal silica particles contained in the beaded colloidal silica particles and $D_1/D_2$ were changed as shown in Tables 2 and 4. In the tables, "PGME" represents propylene glycol monomethyl ether.

Examples 5-1 to 5-5 and Comparative Examples 5-1 to 5-6

Compositions were prepared by the same method as that of Example 1-1, except that the average particle size of the spherical colloidal silica particles contained in the beaded colloidal silica particles, $D_1/D_2$, $D_1$, and the content of $SiO_2$ in silica sol (F) were changed as shown in the following Table 2 or 4. In Comparative Example 5-1, silica sol containing spherical monodisperse colloidal silica particles in which the average particle size was 20 nm, $D_1/D_2$ was 3.1, and $D_1$ was 20 nm was used instead of silica sol containing beaded colloidal silica particles.

Examples 6-1 and 6-2 and Comparative Examples 6-1 and 6-2

Compositions were prepared by the same method as that of Example 1-1, except that the average particle size of the spherical colloidal silica particles contained in the beaded colloidal silica particles, $D_1/D_2$, and $D_1$, were changed as shown in the following Table 2 or 4; and the ratio of silica sol (F) with respect to the hydrolysate of silicon alkoxide (A) and fluoroalkyl group-containing silicon alkoxide (B) was changed such that the content of $SiO_2$ in silica sol (F) with respect to 100 parts by mass of content of $SiO_2$ in the hydrolysate was as shown in the following Table 2 or 4.

TABLE 1

| | Silicon Compound (A) | Silicon Compound (B) | | Water (C) | Acid | | Organic Solvent (E) | |
|---|---|---|---|---|---|---|---|---|
| | | Kind | Mass Ratio | Part(s) by Mass | Kind | Part(s) by Mass | Kind | Part(s) by Mass |
| Example 1-1 | TMOS | TFPTMS | 0.6 | 1.0 | Formic Acid | 0.01 | PGMEA | 1.0 |
| Example 1-2 | TMOS | TFPTES | 0.3 | 1.0 | Formic Acid | 0.01 | PGMEA | 1.0 |
| Example 1-3 | TEOS | TFPTMS | 1.6 | 1.0 | Formic Acid | 0.01 | PGMEA | 1.0 |
| Example 2-1 | TMOS | TFPTMS | 0.6 | 0.5 | Formic Acid | 0.01 | PGMEA | 1.0 |
| Example 2-2 | TMOS | TFPTMS | 0.6 | 3.0 | Formic Acid | 0.01 | PGMEA | 1.0 |
| Example 2-3 | TMOS | TFPTMS | 0.6 | 5.0 | Formic Acid | 0.01 | PGMEA | 1.0 |
| Example 3-1 | TMOS | TFPTMS | 0.6 | 1.0 | Formic Acid | 0.005 | PGMEA | 1.0 |
| Example 3-2 | TMOS | TFPTMS | 0.6 | 1.0 | Formic Acid | 0.1 | PGMEA | 1.0 |
| Example 3-3 | TMOS | TFPTMS | 0.6 | 1.0 | Formic Acid | 0.5 | PGMEA | 1.0 |
| Example 4-1 | TMOS | TFPTMS | 0.6 | 1.0 | Formic Acid | 0.01 | PGMEA | 1.0 |
| Example 4-2 | TMOS | TFPTMS | 0.6 | 1.0 | Formic Acid | 0.01 | Ethanol | 2.5 |
| Example 4-3 | TMOS | TFPTMS | 0.6 | 1.0 | Formic Acid | 0.01 | PGME | 5.0 |
| Example 5-1 | TMOS | TFPTMS | 0.6 | 1.0 | Formic Acid | 0.01 | PGMEA | 1.0 |
| Example 5-2 | TMOS | TFPTMS | 0.6 | 1.0 | Formic Acid | 0.01 | PGMEA | 1.0 |
| Example 5-3 | TMOS | TFPTMS | 0.6 | 1.0 | Formic Acid | 0.01 | PGMEA | 1.0 |
| Example 5-4 | TMOS | TFPTMS | 0.6 | 1.0 | Formic Acid | 0.01 | PGMEA | 1.0 |
| Example 5-5 | TMOS | TFPTMS | 0.6 | 1.0 | Formic Acid | 0.01 | PGMEA | 1.0 |

TABLE 1-continued

|  | Silicon Compound (A) | Silicon Compound (B) Kind | Silicon Compound (B) Mass Ratio | Water (C) Part(s) by Mass | Acid Kind | Acid Part(s) by Mass | Organic Solvent (E) Kind | Organic Solvent (E) Part(s) by Mass |
|---|---|---|---|---|---|---|---|---|
| Example 6-1 | TMOS | TFPTMS | 0.6 | 1.0 | Formic Acid | 0.01 | PGMEA | 1.0 |
| Example 6-2 | TMOS | TFPTMS | 0.6 | 1.0 | Formic Acid | 0.01 | PGMEA | 1.0 |

TABLE 2

|  | Silica Sol (F) | | | |
|---|---|---|---|---|
|  | Beaded Colloidal Silica Particles | | | Content |
|  | Average Particle Size of Spherical Particles (nm) | $D_1/D_2$ | $D_1$ (nm) | of $SiO_2$ (Part(s) by Mass) |
| Example 1-1 | 15 | 5.5 | 80 | 200 |
| Example 1-2 | 15 | 5.5 | 80 | 250 |
| Example 1-3 | 15 | 5.5 | 80 | 250 |
| Example 2-1 | 10 | 4.5 | 80 | 200 |
| Example 2-2 | 10 | 4.5 | 80 | 250 |
| Example 2-3 | 10 | 4.5 | 80 | 250 |
| Example 3-1 | 15 | 5.5 | 80 | 200 |
| Example 3-2 | 20 | 8.0 | 100 | 200 |
| Example 3-3 | 15 | 5.5 | 80 | 200 |
| Example 4-1 | 15 | 5.5 | 80 | 200 |
| Example 4-2 | 10 | 4.5 | 80 | 200 |
| Example 4-3 | 10 | 4.5 | 80 | 200 |
| Example 5-1 | 5 | 3.3 | 30 | 200 |
| Example 5-2 | 50 | 6.0 | 300 | 200 |
| Example 5-3 | 7 | 3.0 | 40 | 200 |
| Example 5-4 | 20 | 5.2 | 30 | 300 |
| Example 5-5 | 40 | 4.7 | 300 | 300 |
| Example 6-1 | 15 | 5.5 | 80 | 100 |
| Example 6-2 | 15 | 5.5 | 80 | 300 |

TABLE 3

|  | Silicon Compound (A) | Silicon Compound (B) Kind | Silicon Compound (B) Mass Ratio | Water (C) Part(s) by Mass | Acid Kind | Acid Part(s) by Mass | Organic Solvent (E) Kind | Organic Solvent (E) Part(s) by Mass |
|---|---|---|---|---|---|---|---|---|
| Comparative Example 1-1 | TMOS | TFPTMS | 0.4 | 1.0 | Formic Acid | 0.01 | PGMEA | 1.0 |
| Comparative Example 1-2 | TMOS | TFPTES | 1.8 | 1.0 | Formic Acid | 0.01 | PGMEA | 1.0 |
| Comparative Example 2-1 | TMOS | TFPTMS | 1.0 | 0.1 | Formic Acid | 0.01 | PGMEA | 1.0 |
| Comparative Example 2-2 | TMOS | TFPTMS | 1.0 | 6.0 | Formic Acid | 0.01 | PGMEA | 1.0 |
| Comparative Example 2-3 | TMOS | TFPTMS | 1.0 | 10 | Formic Acid | 0.01 | PGMEA | 1.0 |
| Comparative Example 3-1 | TMOS | TFPTMS | 1.0 | 1.0 | Formic Acid | 0.003 | GMEA | 1.0 |
| Comparative Example 3-2 | TMOS | TFPTMS | 1.0 | 1.0 | Formic Acid | 0.7 | PGMEA | 1.0 |
| Comparative Example 3-3 | TMOS | TFPTMS | 1.0 | 1.0 | Nitric Acid | 0.1 | PGMEA | 1.0 |
| Comparative Example 3-4 | TMOS | TFPTMS | 1.0 | 1.0 | Acetic Acid | 0.1 | PGMEA | 1.0 |
| Comparative Example 4-1 | TMOS | TFPTMS | 1.0 | 1.0 | Formic Acid | 0.01 | PGMEA | 0.8 |
| Comparative Example 4-2 | TMOS | TFPTMS | 1.0 | 1.0 | Formic Acid | 0.01 | PGMEA | 7.0 |
| Comparative Example 4-3 | TMOS | TFPTMS | 1.0 | 1.0 | Formic Acid | 0.01 | Toluene | 1.0 |
| Comparative Example 5-1 | TMOS | TFPTMS | 1.0 | 1.0 | Formic Acid | 0.01 | PGMEA | 1.0 |
| Comparative Example 5-2 | TMOS | TFPTMS | 1.0 | 1.0 | Formic Acid | 0.01 | PGMEA | 1.0 |
| Comparative Example 5-3 | TMOS | TFPTMS | 1.0 | 1.0 | Formic Acid | 0.01 | PGMEA | 1.0 |
| Comparative Example 5-4 | TMOS | TFPTMS | 1.0 | 1.0 | Formic Acid | 0.01 | PGMEA | 1.0 |
| Comparative Example 5-5 | TMOS | TFPTMS | 1.0 | 1.0 | Formic Acid | 0.01 | PGMEA | 1.0 |
| Comparative Example 5-6 | TMOS | TFPTMS | 1.0 | 1.0 | Formic Acid | 0.01 | PGMEA | 1.0 |

TABLE 3-continued

| | Silicon Compound (A) | Silicon Compound (B) | | Water (C) | Acid | | Organic Solvent (E) | |
|---|---|---|---|---|---|---|---|---|
| | | Kind | Mass Ratio | Part(s) by Mass | Kind | Part(s) by Mass | Kind | Part(s) by Mass |
| Comparative Example 6-1 | TMOS | TFPTMS | 1.0 | 1.0 | Formic Acid | 0.01 | PGMEA | 1.0 |
| Comparative Example 6-2 | TMOS | TFPTMS | 1.0 | 1.0 | Formic Acid | 0.01 | PGMEA | 1.0 |

TABLE 4

| | Silica Sol (F) | | | |
|---|---|---|---|---|
| | Beaded Colloidal Silica Particles | | | Content of $SiO_2$ (Part(s) by Mass) |
| | Average Particle Size of Spherical Particles (nm) | $D_1/D_2$ | $D_1$ (nm) | |
| Comparative Example 1-1 | 15 | 5.5 | 80 | 200 |
| Comparative Example 1-2 | 15 | 5.5 | 80 | 250 |
| Comparative Example 2-1 | 10 | 4.5 | 80 | 200 |
| Comparative Example 2-2 | 10 | 4.5 | 80 | 250 |
| Comparative Example 2-3 | 10 | 4.5 | 80 | 250 |
| Comparative Example 3-1 | 15 | 5.5 | 80 | 200 |
| Comparative Example 3-2 | 20 | 8.0 | 100 | 200 |
| Comparative Example 3-3 | 15 | 5.5 | 80 | 200 |
| Comparative Example 3-4 | 15 | 5.5 | 80 | 200 |
| Comparative Example 4-1 | 15 | 5.5 | 80 | 200 |
| Comparative Example 4-2 | 10 | 4.5 | 80 | 200 |
| Comparative Example 4-3 | 10 | 4.5 | 80 | 200 |
| Comparative Example 5-1 | Spherical Particles | | | 200 |
| Comparative Example 5-2 | 2.5 | 4.5 | 80 | 200 |
| Comparative Example 5-3 | 60 | 4.5 | 80 | 200 |
| Comparative Example 5-4 | 10 | 2 | 80 | 200 |
| Comparative Example 5-5 | 10 | 4.5 | 25 | 200 |
| Comparative Example 5-6 | 10 | 4.5 | 320 | 200 |
| Comparative Example 6-1 | 10 | 4.5 | 50 | 5 |
| Comparative Example 6-2 | 10 | 4.5 | 50 | 600 |

Comparative Test and Evaluation

A surface of a glass substrate as a substrate was coated with each composition prepared in Examples 1-1 to 6-2 and Comparative Examples 1-1 to 6-2 according to a spin coating method to form a coating film. The glass substrate on which this coating film was formed was dried using an atmosphere firing furnace at a temperature of 50° C. for 10 minutes and was fired using an atmosphere firing furnace at a temperature of 130° C. to be cured. As a result, a film having a thickness of about 80 angstrom was formed. These films were evaluated for the refractive index, the wettability of a film surface, and the permeability (haze). The results thereof are shown in the following Table 5 or 6.

(i) Refractive index: A value at 633 nm was obtained among optical constant values which were measured and analyzed using a spectral ellipsometer (manufactured by J.A. Woollam Japan, Model: M-2000)

(ii) Wettability: The contact angle of water was measured using DROP MASTER M-700 (manufactured by Kyowa Interface Science Co., Ltd.) and a syringe filled with ion exchange water. Films in which the contact angle of water 100 msec after the contact with a film surface was about 40° to 70° when analyzed using the θ/2 method in the stationary state, were evaluated as "Satisfactory". In films in which the contact angle was not within the above-described range, solutions flowed to a large extent when coating was performed multiple times, and most of the solutions were lost; and films which had high water repellency to the extent that solutions were not uniformly spread out when coating was performed multiple times, were evaluated as "Unsatisfactory" because coating properties were low.

(iii) Haze: The haze was measured using a haze meter HZ-V3 (manufactured by Suga Test Instruments Co., Ltd.). The haze is represented by the numerical value obtained by the expression of "Diffuse Transmittance of Film/Total Light Transmittance×100", and has a higher value as a film becomes cloudier.

TABLE 5

| | Refractive Index | Wettability | Haze |
|---|---|---|---|
| Example 1-1 | 1.30 | Satisfactory | 0.02 |
| Example 1-2 | 1.25 | Satisfactory | 0.02 |
| Example 1-3 | 1.20 | Satisfactory | 0.02 |
| Example 2-1 | 1.31 | Satisfactory | 0.02 |
| Example 2-2 | 1.28 | Satisfactory | 0.02 |
| Example 2-3 | 1.25 | Satisfactory | 0.14 |
| Example 3-1 | 1.21 | Satisfactory | 0.02 |
| Example 3-2 | 1.25 | Satisfactory | 0.02 |
| Example 3-3 | 1.27 | Satisfactory | 0.02 |
| Example 4-1 | 1.31 | Satisfactory | 0.05 |
| Example 4-2 | 1.30 | Satisfactory | 0.04 |
| Example 4-3 | 1.35 | Satisfactory | 0.04 |
| Example 5-1 | 1.31 | Satisfactory | 0.18 |
| Example 5-2 | 1.38 | Satisfactory | 0.40 |
| Example 5-3 | 1.30 | Satisfactory | 0.17 |
| Example 5-4 | 1.32 | Satisfactory | 0.12 |
| Example 5-5 | 1.34 | Satisfactory | 0.15 |
| Example 6-1 | 1.38 | Satisfactory | 0.04 |
| Example 6-2 | 1.25 | Satisfactory | 0.07 |

TABLE 6

| | Refractive Index | Wettability | Haze |
|---|---|---|---|
| Comparative Example 1-1 | 1.35 | Unsatisfactory | 0.02 |
| Comparative Example 1-2 | 1.28 | Unsatisfactory | 0.08 |

TABLE 6-continued

| | Refractive Index | Wettability | Haze |
|---|---|---|---|
| Comparative Example 2-1 | 1.35 | Unsatisfactory | 2.56 |
| Comparative Example 2-2 | 1.32 | Unsatisfactory | 1.91 |
| Comparative Example 2-3 | — | — | — |
| Comparative Example 3-1 | — | — | — |
| Comparative Example 3-2 | 1.38 | Satisfactory | 1.56 |
| Comparative Example 3-3 | 1.41 | Satisfactory | 4.3 |
| Comparative Example 3-4 | 1.35 | Satisfactory | 2.89 |
| Comparative Example 4-1 | 1.41 | Satisfactory | 3.11 |
| Comparative Example 4-2 | 1.45 | Satisfactory | 0.06 |
| Comparative Example 4-3 | — | — | — |
| Comparative Example 5-1 | 1.45 | Satisfactory | 0.05 |
| Comparative Example 5-2 | 1.38 | Satisfactory | 2.64 |
| Comparative Example 5-3 | 1.45 | Satisfactory | 1.8 |
| Comparative Example 5-4 | 1.38 | Satisfactory | 3.0 |
| Comparative Example 5-5 | 1.32 | Satisfactory | 2.1 |
| Comparative Example 5-6 | 1.33 | Satisfactory | 2.5 |
| Comparative Example 6-1 | 1.41 | Satisfactory | 0.06 |
| Comparative Example 6-2 | 1.25 | Unsatisfactory | 0.07 |

When Examples 1-1 to 1-3 are compared to Comparative Examples 1-1 and 1-2, the following results are clearly shown from Tables 5 and 6. In Comparative Example 1-1 in which the mass ratio of fluoroalkyl group-containing silicon alkoxide (B) was lower than 0.6 with respect to the ratio of silicon alkoxide (A) of 1, the refractive index of the film was particularly higher than those of Examples 1-1 to Examples 1-3. In addition, in Comparative Example 1-2 in which the ratio of fluoroalkyl group-containing silicon alkoxide (B) was higher than 1.6, the result for the wettability of the film surface was poor. On the other hand, in Examples 1-1 to 1-3 in which the ratio of fluoroalkyl group-containing silicon alkoxide (B) was in the range of 0.6 to 1.6, the results were superior in all the evaluations for the refractive index, the wettability of the film surface, and the haze.

In addition, when Examples 2-1 to 2-3 are compared to Comparative Examples 2-1 to 2-3, the following results are shown. In Comparative Example 2-1 in which the ratio of water (C) with respect to 1 part by mass of the mixture of silicon oxide (A) and fluoroalkyl group-containing silicon oxide (B) was less than 0.5 parts by mass, the refractive index of the film and the haze value were particularly higher than those of Examples 2-1 to 2-3. In addition, in Comparative Example 2-2 in which the ratio of water (C) was greater than 5.0 parts by mass, the haze value was higher than those of Examples 2-1 to 2-3. In addition, in both Comparative Examples 2-1 and 2-2, the result for the wettability of the film surface was poor. In addition, in Comparative Example 2-3 in which the ratio of water (C) was 10 parts by mass, a film having a uniform thickness after coating and drying could not be formed. On the other hand, in Examples 2-1 to 2-3 in which the ratio of water (C) was in the range of 0.5 parts by mass to 5.0 parts by mass, the results were superior in all the evaluations for the refractive index, the wettability of the film surface, and the haze.

In addition, when Examples 3-1 to 3-3 are compared to Comparative Examples 3-1 and 3-2, the following results are shown. In Comparative Example 3-1 in which the ratio of formic acid (D) with respect to 1 part by mass of the mixture of silicon oxide (A) and fluoroalkyl group-containing silicon oxide (B) was less than 0.005 parts by mass, the reaction did not sufficiently advance and a film could not be formed. In addition, in Comparative Example 3-2 in which the ratio of formic acid (D) was greater than 0.5 parts by mass, the haze value was higher than those of Examples 3-1 to 3-3. In addition, in Comparative Examples 3-3 and 3-4 in which nitric acid and acetic acid were used, respectively, instead of formic acid, the haze value was high and a film having satisfactory permeability could not be obtained. On the other hand, in Examples 3-1 to 3-3 in which the ratio of formic acid (D) was in the range of 0.005 parts by mass to 0.5 parts by mass, the results were superior in all the evaluations for the refractive index, the wettability of the film surface, and the haze.

In addition, when Examples 4-1 to 4-3 are compared to Comparative Examples 4-1 and 4-2, the following results are shown. In Comparative Example 4-1 in which the ratio of the organic solvent (E) with respect to 1 part by mass of the mixture of silicon oxide (A) and fluoroalkyl group-containing silicon oxide (B) was less than 1.0 part by mass, the haze value was significantly high. In addition, in Comparative Example 4-2 in which the ratio of the organic solvent (E) was greater than 5.0 parts by mass, the haze value was higher than those of Examples 4-1 to 4-3. In addition, in Comparative Example 4-3 in which toluene was used as the organic solvent (E), coating properties were poor and a film could not be formed. On the other hand, in Examples 4-1 to 4-3 in which the ratio of the organic solvent (E) was in the range of 1.0 part by mass to 5.0 parts by mass, the results were superior in all the evaluations for the refractive index, the wettability of the film surface, and the haze.

In addition, when Examples 5-1 to 5-5 are compared to Comparative Examples 5-1 to 5-6, the following results are shown. In Comparative Example 5-2 in which the average particle size of the spherical colloidal silica particles contained in the beaded colloidal spherical particles was less than 5 nm, the haze value was particularly higher than those of Examples 5-1 to 5-5. In addition, in Comparative Example 5-3 in which the average particle size was greater than 50 nm, the refractive index and the haze value were particularly higher than those of Examples 5-1 to 5-5. In addition, in Comparative Example 5-4 in which the ratio $D_1/D_2$ of the spherical colloidal silica particles contained in the beaded colloidal spherical particles was lower than 3, the haze value was particularly higher than those of Examples 5-1 to 5-5. In addition, in both Comparative Example 5-5 in which the average particle size $D_1$ of the spherical colloidal silica particles contained in the beaded colloidal spherical particles was less than 30 nm and Comparative Example 5-6 in which the average particle size $D_1$ was greater than 300 nm, the haze value was higher than those of Examples 5-1 to 5-5. In addition, in Comparative Example 5-1 using silica sol in which spherical colloidal silica particles were dispersed instead of beaded colloidal silica particles, the refractive index of the film was higher than those of Examples 5-1 to 5-5. On the other hand, in Examples 5-1 to 5-5 in which the average particle size of the spherical colloidal silica particles contained in the beaded colloidal spherical particles was 5 nm to 50 nm, $D_1/D_2$ was higher than or equal to 3, and $D_1$ was 30 nm to 300 nm, the results were superior in all the evaluations for the refractive index, the wettability of the film surface, and the haze.

In addition, when Examples 6-1 and 6-2 are compared to Comparative Examples 6-1 and 6-2, the following results are shown. In Comparative Example 6-1 in which the ratio of silica sol (F) was adjusted such that the content of $SiO_2$ in silica sol (F) with respect to 100 parts by mass of content of $SiO_2$ in the hydrolysate was less than 50 parts by mass, the haze value was higher than those of Examples 6-1 and 6-2. In addition, in Comparative Example 6-2 in which the content of $SiO_2$ in silica sol (F) was greater than 500 parts by mass, the haze value was particularly higher than those of Examples 6-1 and 6-2 and the result for the wettability of the film surface was poor. On the other hand, in Examples 6-1 and 6-2 in which the content of $SiO_2$ in silica sol (F) was 50 parts by mass to 500 parts by mass, the results were superior in all the evaluations for the refractive index, the wettability of the film surface, and the haze.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

FIELD OF INDUSTRIAL APPLICATION

The low refractive index film-forming composition according to the invention can be used for forming an antireflection film which prevents the reflection of incident light on a display panel such as a cathode-ray tube display, a liquid crystal display, or an organic EL display, a solar cell, or a showcase glass; or for forming an interlayer film which is used for a sensor, a camera module, or the like and uses a refractive index difference.

What is claimed is:

1. A low refractive index film-forming composition comprising:

a hydrolysate of fluoroalkyl group-containing silicon alkoxide (B) represented by the following formula (2) and silicon alkoxide (A) represented by the following formula (1); and silica sol (F) including beaded colloidal silica particles, wherein a mass ratio of silicon alkoxide (A) to silicon alkoxide (B) is 1:0.6 to 1:1.6 (A:B), a content of $SiO_2$ in the silica sol (F) is 50 parts by mass to 500 parts by mass with respect to 100 parts by mass of content of $SiO_2$ in the hydrolysate, a plurality of spherical colloidal silica particles which is contained in the beaded colloidal silica particles having an average particle size of 5 nm to 50 nm which is measured with a BET method, the plurality of spherical colloidal silica particles are linked to each other through metal oxide-containing silica in the beaded colloidal silica particles, a ratio $D_1/D_2$ of an average particle size ($D_1$ nm) of the spherical colloidal silica particles, which is measured with a dynamic light scattering method, to an average particle size ($D_2$ nm) of the spherical colloidal silica particles, which is obtained according to an expression of $D_2=2720/S$ in which a specific surface area $S\ m^2/g$ is measured with a nitrogen adsorption method, is 3 to 20, the average particle size $D_1$ is 30 nm to 300 nm, and the spherical colloidal silica particles are linked to one plane:

$$Si(OR)_4 \qquad (1),$$

wherein R represents an alkyl group having 1 to 5 carbon atoms;

$$CF_3(CF_2)_nCH_2CH_2Si(OR^1)_3 \qquad (2),$$

wherein $R_1$ represents an alkyl group having 1 to 5 carbon atoms and n represents an integer of 0 to 8.

2. A low refractive index film-forming composition according to claim 1, wherein a plurality of spherical colloidal silica particles which is contained in the beaded colloidal silica particles have an average particle size of 5 nm to 30 nm which is measured with a BET method.

3. A low refractive index film-forming composition according to claim 1, wherein the average particle size $D_1$ is 35 nm to 150 nm.

* * * * *